UNITED STATES PATENT OFFICE.

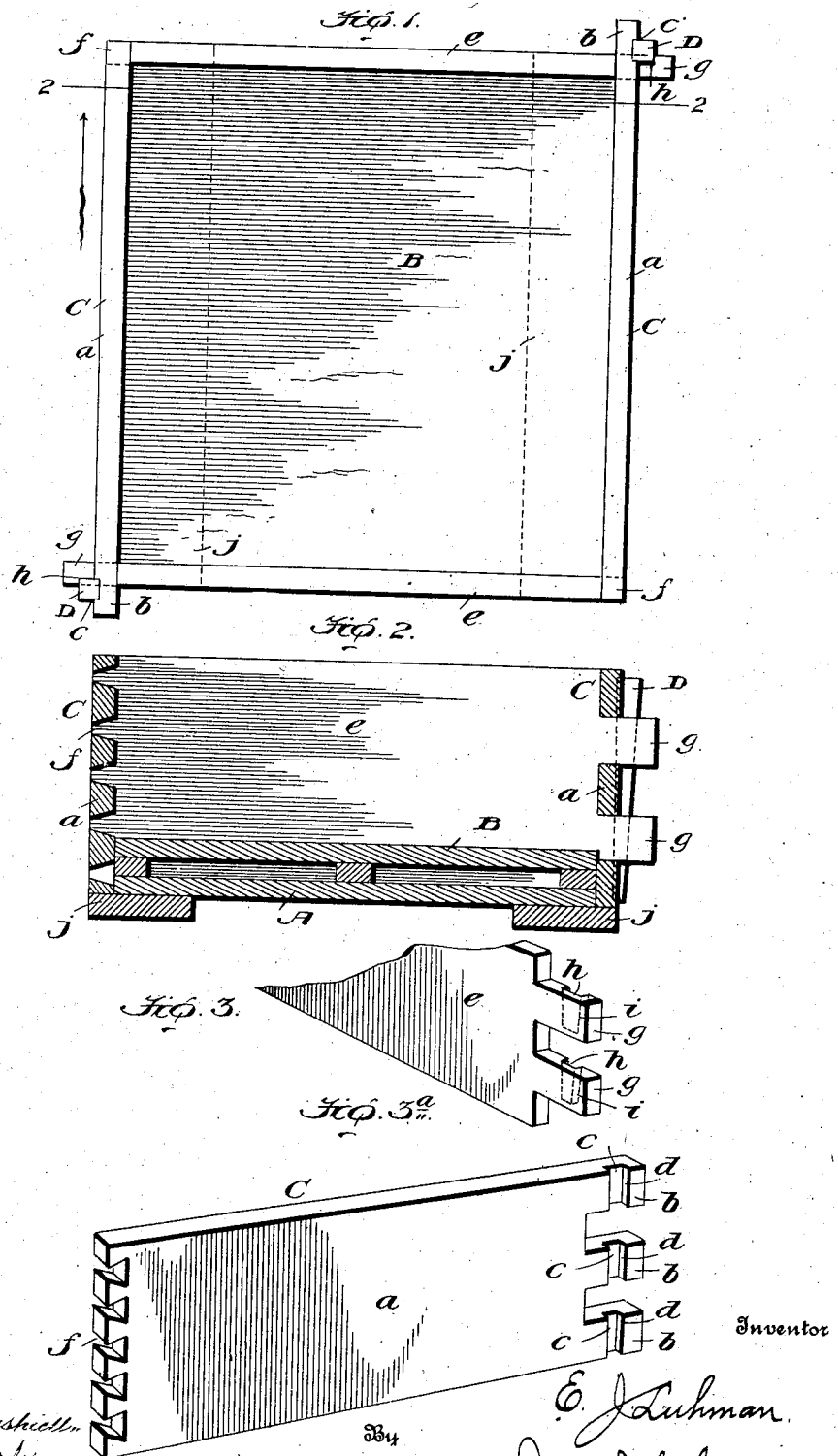

EDWARD J. LUHMAN, OF SAN FRANCISCO, CALIFORNIA.

BUTTER MOLD OR TRAY.

No. 834,826.  Specification of Letters Patent.  Patented Oct. 30, 1906.

Application filed April 3, 1906. Serial No. 309,682.

*To all whom it may concern:*

Be it known that I, EDWARD J. LUHMAN, a citizen of the United States, residing at San Francisco, in the county of San Francisco and State of California, have invented new and useful Improvements in Butter Molds or Trays, of which the following is a specification.

This invention pertains to molds; and it contemplates the provision of a simple and efficient mold designed more particularly for giving shape to butter and other material susceptible of being cut with wires and one constructed with a view of being readily taken apart, so as to leave the mass of butter in a position on one section of the mold to be cut through the medium of wires, and in that way reduced to a plurality of cubes or small blocks.

With the foregoing in mind the invention will be fully understood from the following description and claims when the same are read in connection with the accompanying drawings, forming part of this specification, in which—

Figure 1 is a top plan view of the mold constituting the present and preferred embodiment of the invention. Fig. 2 is a section taken in the plane indicated by the line 2 2 of Fig. 1 looking in the direction indicated by the arrow. Fig. 3 is a detail perspective view illustrating the appurtenances provided at one end of each side section of the mold, and Fig. 3ª is a perspective view of one of the boards or plates comprised in each side section of the mold.

Similar letters designate corresponding parts in all of the views of the drawings, referring to which—

A is the bottom of the mold, which may be and preferably is a rectangular piece of wood or other material suitable to the purpose of the invention.

B is a false bottom removably arranged on the bottom A with a view of reducing the height of the interior of the mold when necessity demands.

C C are the side sections of the mold, and D D are the keys through the medium of which the side sections C are detachably connected together and retained in proper position relative to the bottom A and the false bottom B. The side sections C are identical in construction, and therefore a detailed description of one side section will suffice to impart a definite understanding of both. The said side section is made of wood or other material compatible with the purpose of the invention and comprises an arm $a$, having three (more or less) tongues $b$ at one end, in the outer sides of which are vertical alined grooves $c$, the outer walls $d$ of which are inclined, and an arm $e$, disposed at a right angle to the arm $a$ and permanently joined in a fixed manner by a dovetail $f$ thereto at one end and having at its opposite end two (more or less) tongues $g$, in the outer sides of which are vertically-alined grooves $h$, the outer walls $i$ of which are inclined, as best shown in Fig. 3. When deemed expedient, it is obvious that each side section C might be formed in one piece of material without departure from the scope of the invention. The keys D are tapered or gradually reduced in thickness from their upper ends to their lower ends after the manner shown in Fig. 2.

As best shown in Fig. 2, the bottom A is provided on its under side with ledges $j$, which are designed to rest below the lower edges of the side sections C, with a view of supporting the said side sections at the proper height relative to the bottom.

In assembling the parts of the novel mold the side sections C are arranged at opposite sides of the bottom A and false bottom B and on the ledges $j$, and said side sections C are connected together in the manner illustrated—that is to say, the tongues $g$ of each section are disposed between the tongues $b$ of the other section and at right angles to said tongues $b$, Fig. 1—and the keys D are dropped and pushed home in the opposed grooves $h$ and $c$ of the tongues $g$ and $b$, respectively. When this is done, it will be apparent that the side sections C will be secured in proper position relative to each other and the bottoms and without liability of casual disarrangement of any of the parts. It will also be apparent that when the keys D are withdrawn from the grooves in the side sections, as after a mass of butter has been shaped in the mold, the bottoms and one side section C may be readily removed from the mass of butter without destroying the shape thereof, the mass of butter being left on one arm of the other side section C and against the inner side of the other arm thereof in order to permit of it being conveniently presented to the wires of a butter-cutting machine after the manner shown in Fig. 1 of my Letters Patent No. 818,770, of April 24, 1906. From this it follows that each side section C of my device is adapted to serve as a butter-tray.

While the invention has been specifically described both as to the construction and relative arrangement of the parts, it is obvious that such changes or modifications may be made in practice as fairly fall within the scope of the invention as claimed.

Having described my invention, what I claim, and desire to secure by Letters Patent, is—

1. A mold for giving shape to butter and other material, comprising a bottom, and side sections arranged at opposite sides of and removable from the bottom and detachably connected together at their ends; each of the said side sections having arms $a$ and $e$ fixed to each other and forming a permanent right-angle side section.

2. A mold for giving shape to butter and other material, comprising a bottom, side sections arranged at opposite sides of and removable from the bottom and having interlapped tongues at their ends in the outer sides of which are provided opposed grooves; each of the said side sections being formed by arms fixed at right angles to each other, and taper keys removably arranged in the said opposed grooves of the side sections.

3. A mold for giving shape to butter and other material, comprising a bottom having ledges extending beyond its edges, side sections arranged at opposite sides of the bottom and on the extended portions of the ledges and having interlapped tongues at their ends in the outer sides of which are provided vertically-disposed opposed grooves, and taper keys arranged in the said opposed grooves of the side sections and removable from said sections.

4. A mold for giving shape to butter and other material, comprising a bottom having ledges extending beyond its edges, side sections arranged at opposite sides of the bottom and on the extended portions of the ledges and having arms fixed at right angles to each other and also having interlapped tongues at their ends in the outer sides of which are provided opposed grooves, taper keys arranged in the said opposed grooves of the side sections, and a false bottom disposed between the side sections and removable from said sections and on the bottom.

In testimony whereof I have hereunto set my hand in presence of two subscribing witnesses.

EDWARD J. LUHMAN.

Witnesses:
 GEORGE F. BRUNIS,
 A. D. DUNLEAVY.